3,098,131
TIMING MECHANISM
William P. Gallagher, Coral Gables, and Richard J. Dykinga, Perrine, Fla., assignors to International Register Company, Richmond, Ill., a corporation of Illinois
Filed Aug. 17, 1960, Ser. No. 54,560
15 Claims. (Cl. 200—38)

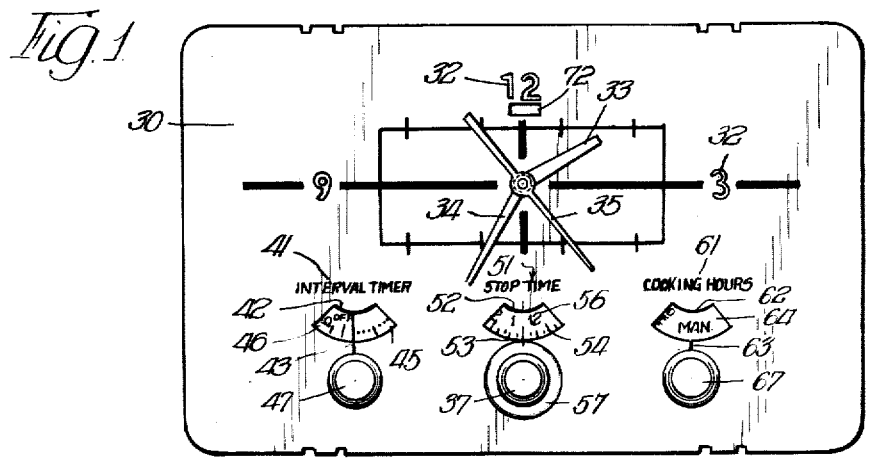
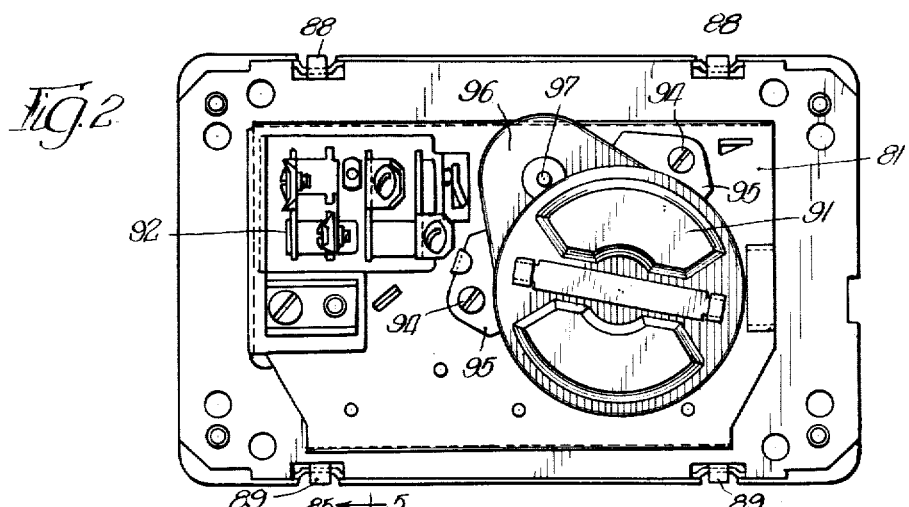
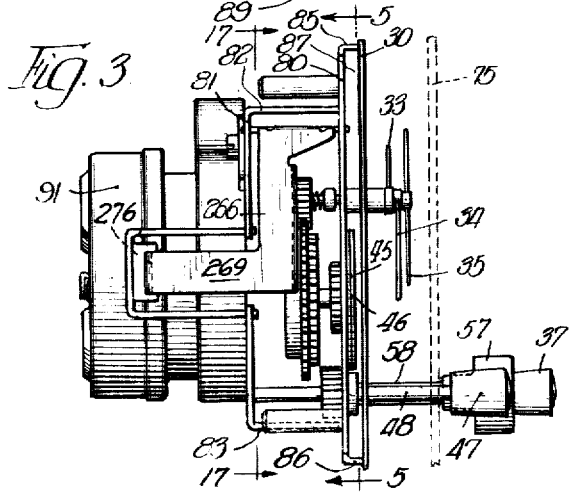
INVENTORS
William P. Gallagher,
Richard J. Dykinga,
By: Brown, Jackson,
Boettcher & Dienner
Attys.

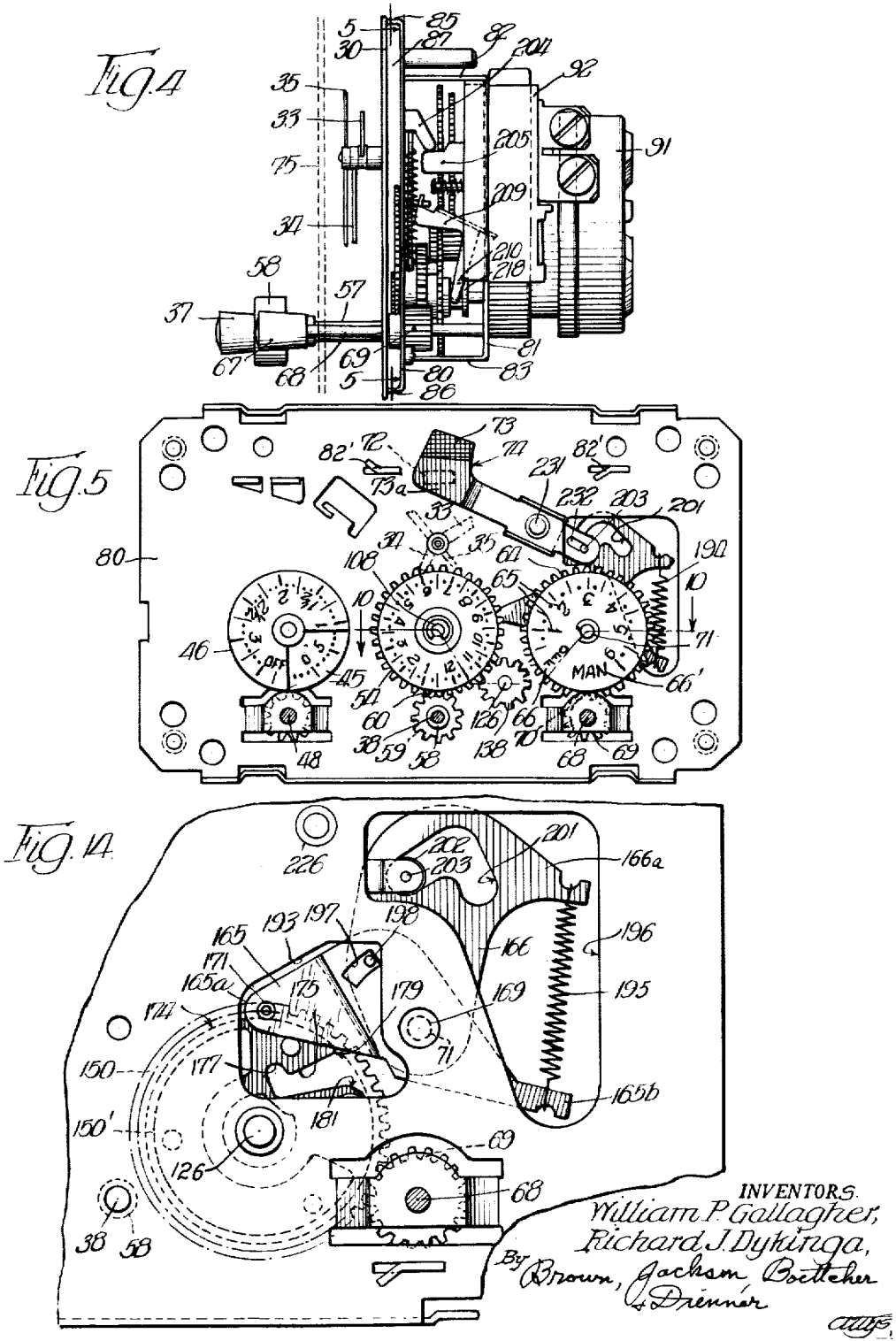

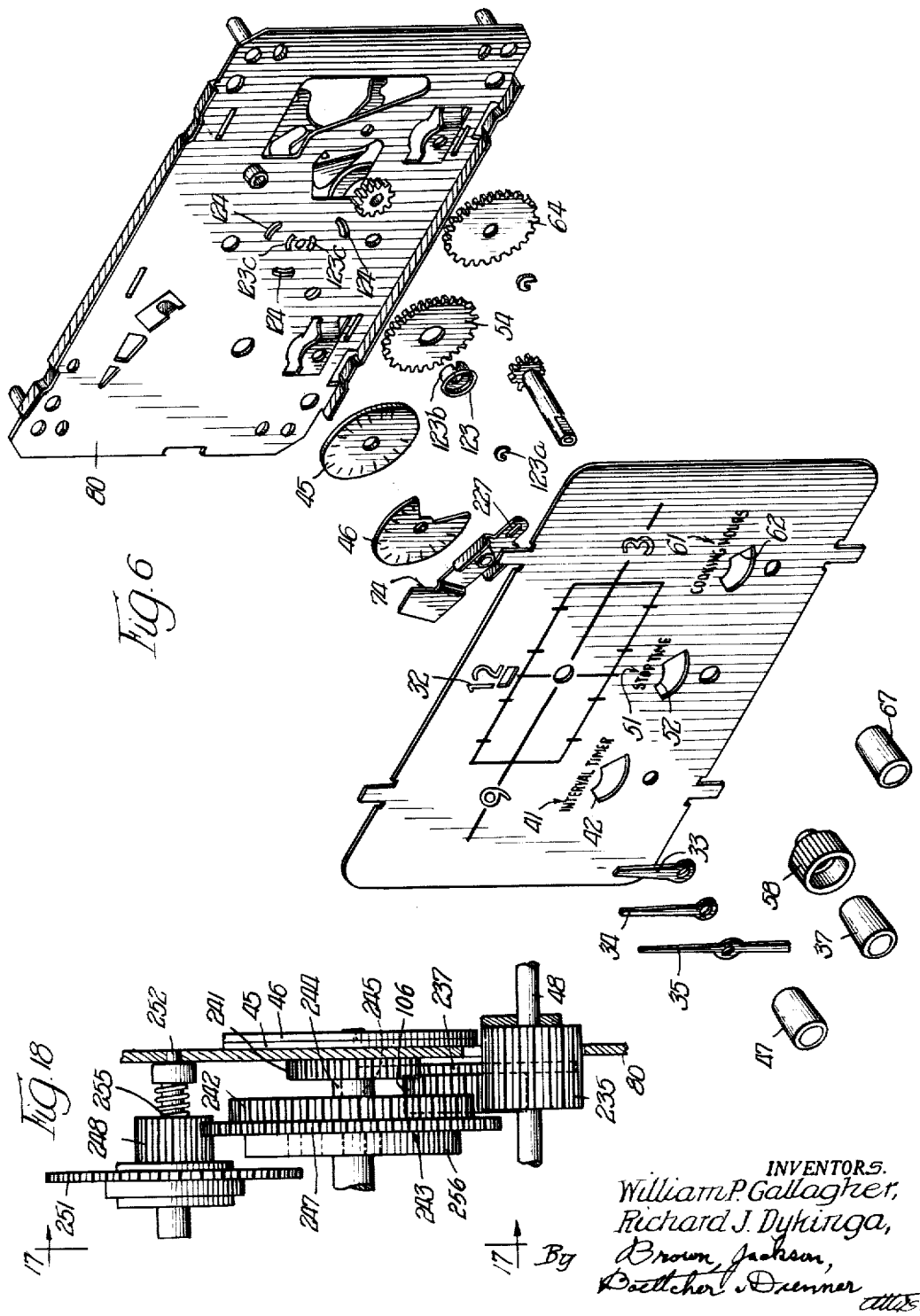

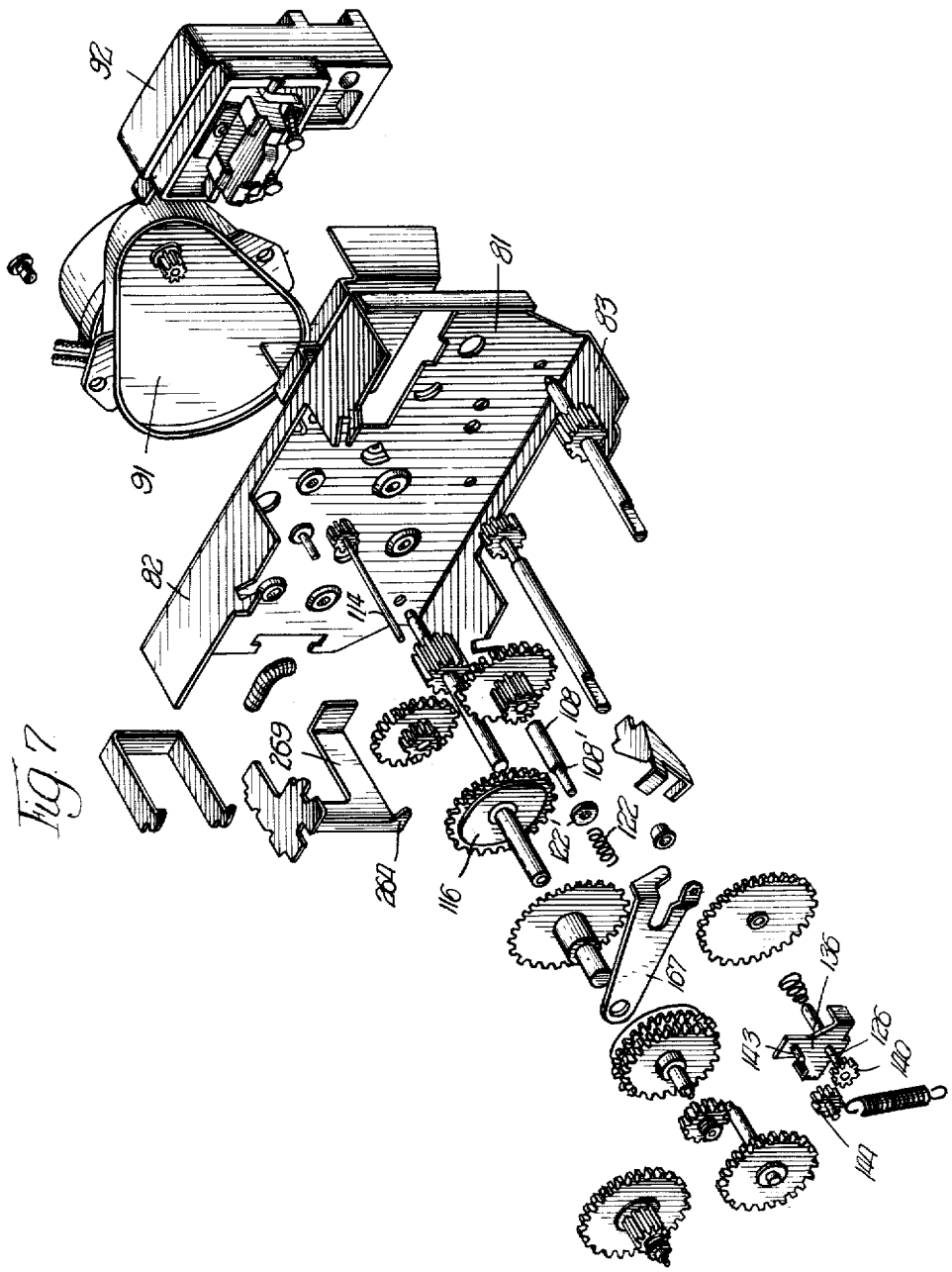

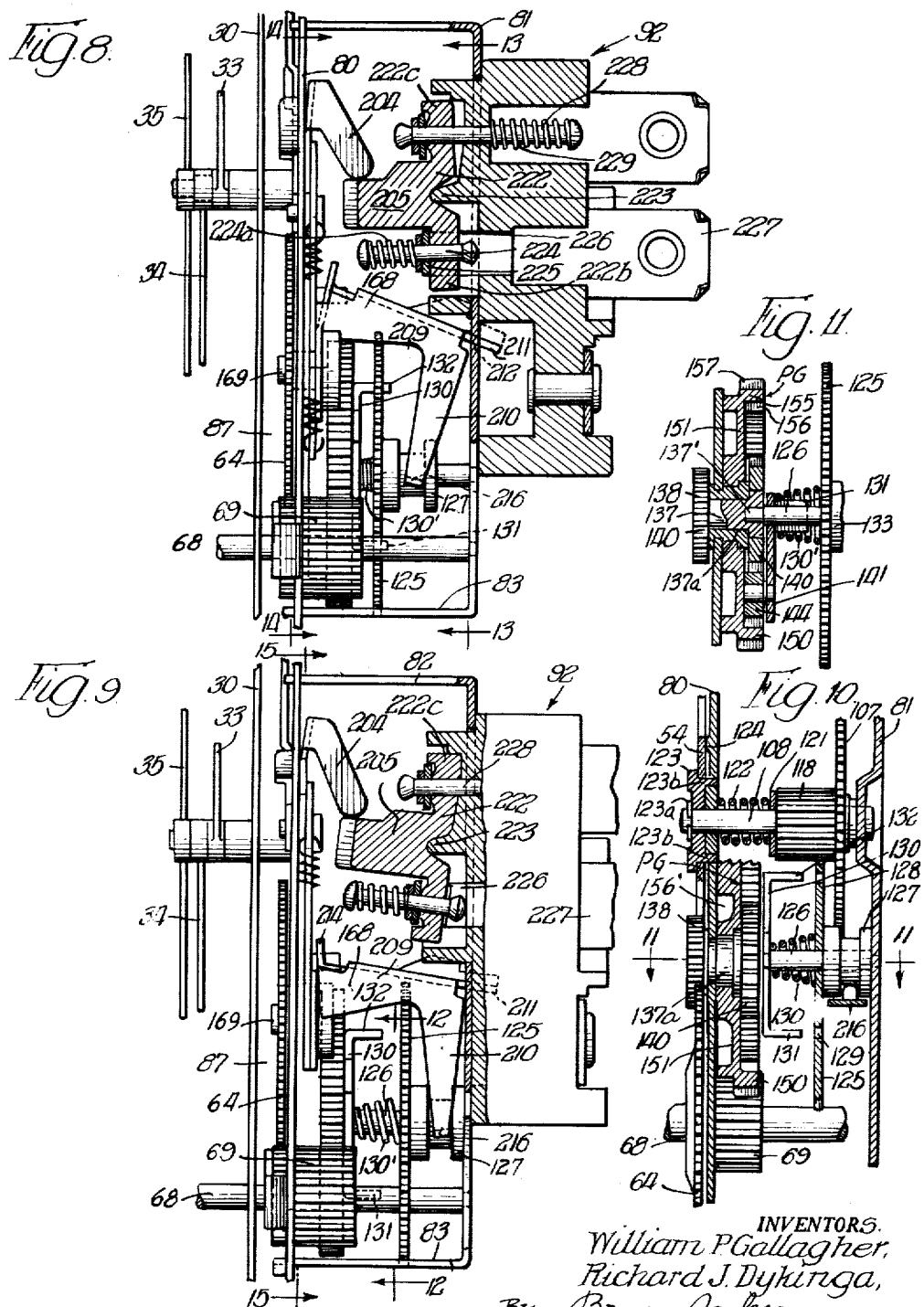

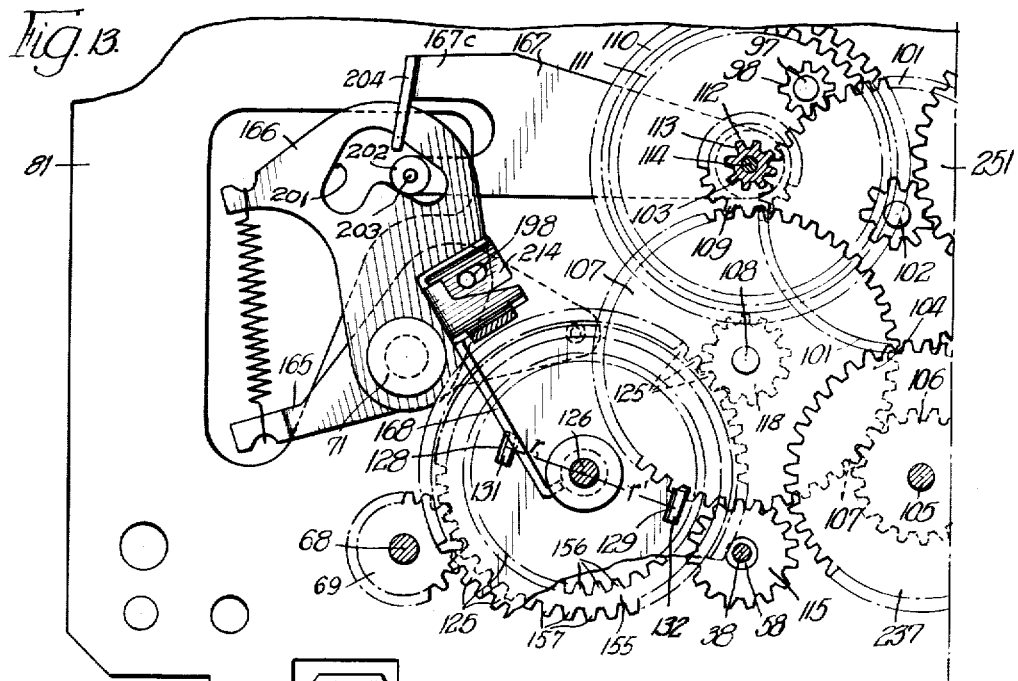
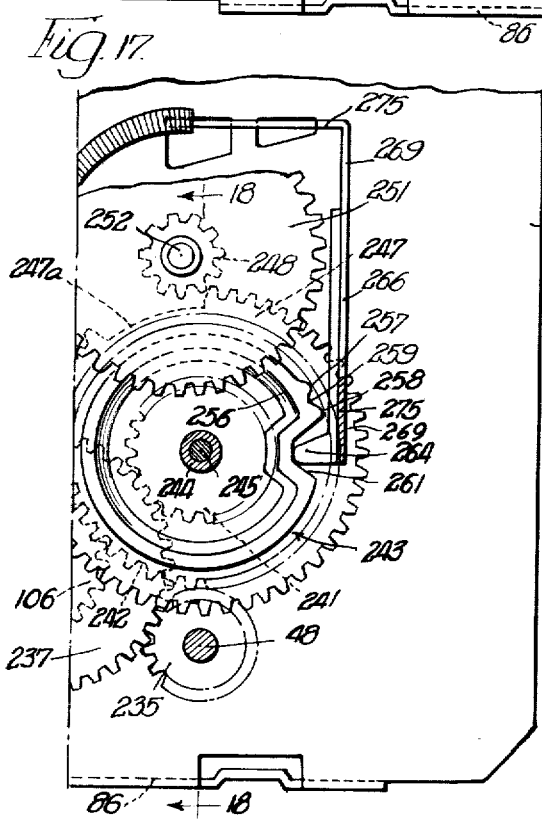
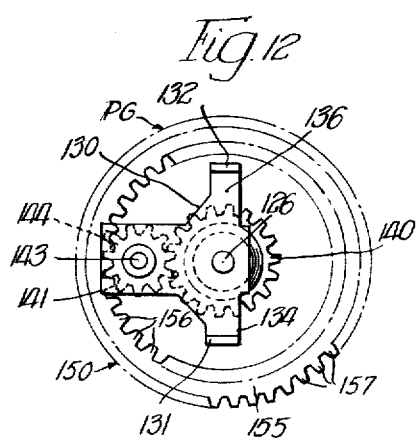
INVENTORS
William P. Gallagher,
Richard J. Dykinga,
By Brown, Jackson,
Boettcher + Dienner attys

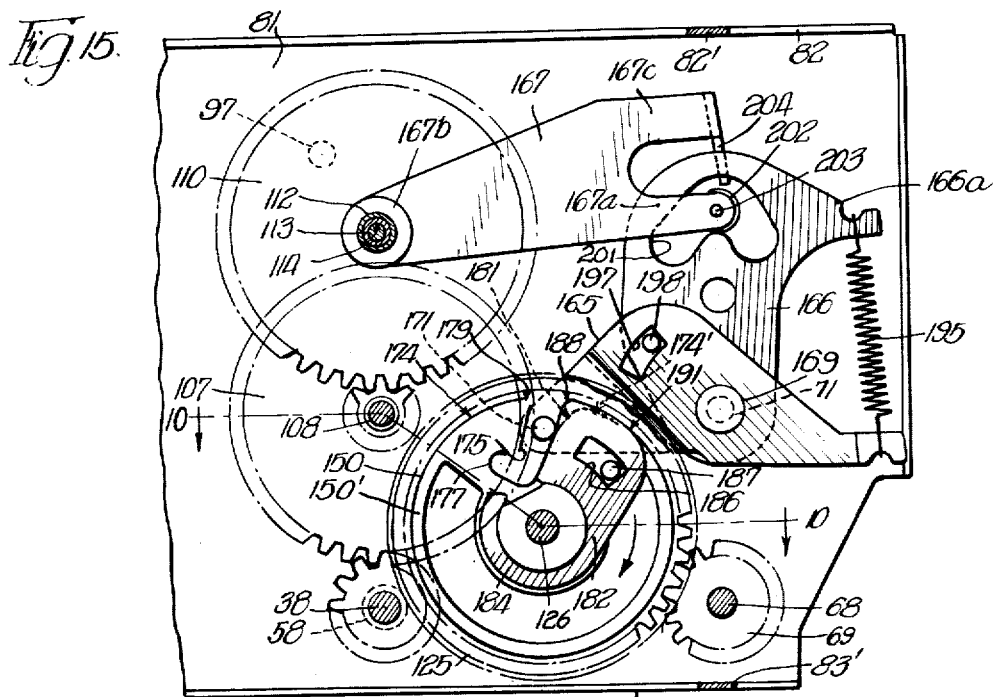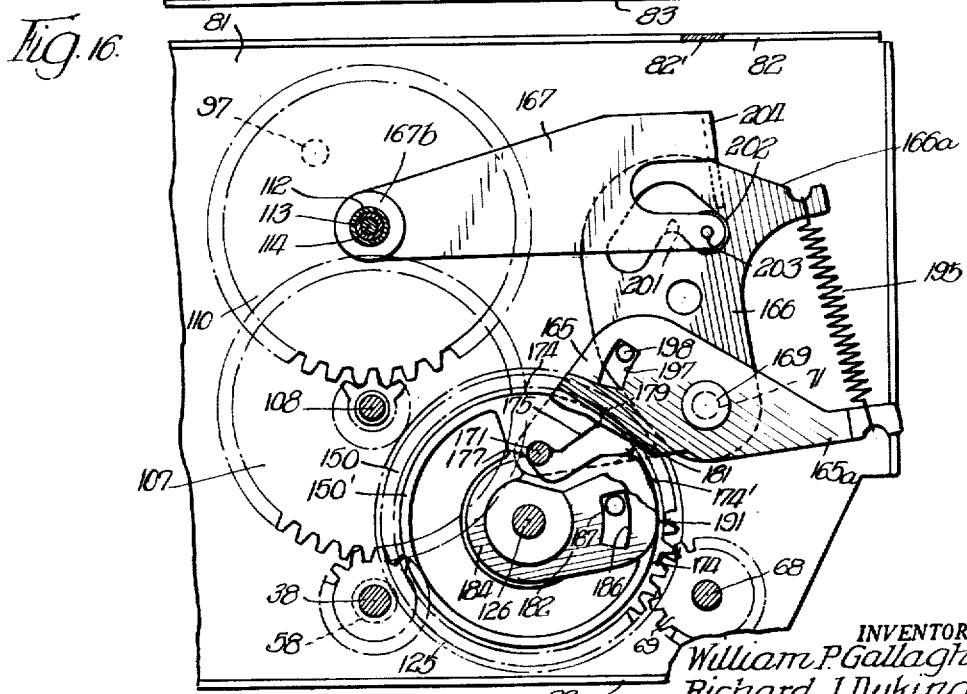

The present invention relates to timing mechanisms, such as time switches, interval timers and the like. For the purpose of illustrating one preferred aspect of the invention, we have herein illustrated the invention in its primary use in the form of an automatic time switch for cooking stoves, cooking ovens, and the like, either of the electrically heated or of the gas heated type. These range timers enable the housewife to set the cooking range or oven for automatically performing a cooking operation of a predetermined length of time or duration, and for automatically terminating this cooking operation at a certain preselected time.

One of the principal objects of the invention is to provide an improved time switch in which the time components can be set up by the unique utilization of an improved system of planetary gearing. Such planetary gearing comprises a rotatable sun gear rotating about a fixed axis; a planetary gear meshing therewith and rotating on an axis which can revolve orbitally around the sun gear; and an outer internal ring gear which meshes constantly with the outer periphery of the planetary gear and is also mounted for rotation concentrically of the sun gear. The mechanism for effecting automatic operation of the electric switch at different preselected times is caused to operate through this system of planetary gearing, i.e. these different preselected times can be set up through manual operation of different elements of the above system of planetary gearing. For example, the stop-time setting for stopping the cooking operation may be set up by manually rotating the sun gear through a predetermined range, which concurrently causes the planetary gear to rotate in the corresponding direction through its predetermined orbital path, during which time the outer ring gear is maintained stationary. Thereupon, the cooking hours time for determining the duration of the cooking operation is set up by manually rotating the outer planetary ring gear to change the position of the planetary pinion from the orbital position in which it was left by the rotation of the sun gear in making the aforesaid stop-time setting. The final position of the planetary pinion represents a differential relation between the orbital motion transmitted to it by the first described rotation of the sun gear in making the stop-time setting, and the orbital motion which is transmitted to it by the second described rotation of the outer internal ring gear in making the cooking hours setting. This final position of the planetary pinion automatically predetermines the time when the cooking operation is to start, without requiring the housewife having to make any mathematical computation, based on stop cooking time and cooking hours time. Also, the time interval that the cooking operation is to continue, after having been started as above described, is determined by the degree of rotative movement which has been transmitted to the outer internal ring gear of the planetary system through the manual rotation of the cooking hours setting knob.

Another object of the invention is to provide the rotatable mounting spider which mounts the planetary pinion of the planetary gear system with tripping lugs which are adapted to snap into tripping slots formed in a continuously rotating time driven wheel. Relative axial shifting motion is adapted to occur between this slotted time driven wheel and the mounting spider of the planetary system to bring the tripping lugs into pressure engagement against the surface of the time driven wheel where these tripping lugs can snap into registration with the associated tripping slots at one of the automatically determined time intervals, such as when the cooking operation is to start.

Another object of the invention is to provide the internal ring gear of the planetary system with an improved arrangement of cam surfaces which operate upon a system of levers for performing the above-described relative axial shifting between the time driven wheel having the tripping slots therein and the planetary gear system spider having the tripping lugs projecting therefrom for entering said tripping slots at the start of the cooking operation; and for also performing the further operation of controlling the positions of the electric switch in accordance with the angular positions of the cam surfaces formed on the internal ring gear of the planetary system.

Another object of the invention is to provide improved timing mechanism of the above general description wherein (1) the clock face and hands; (2) the range timer dials and controls; and (3) the interval timer dials and controls—are all separate distinct entities across the face of the instrument for greater simplicity and less confusion in setting the clock, the range timer, and the interval timer. It is a further, more specific object in this regard to combine the clock, range timer and interval timer in a device of very small overall size which lends itself more readily to use in small electric ranges or in other situations where space is at a premium, this small overall size resulting considerably or largely from the use of the planetary gear system in the range timer part of the device.

It is a further object of the invention to provide a range timer wherein the stop cooking dial and the cooking hours dial are mounted on separate spaced axes, and wherein these two dials are manually adjusted through setting knobs having rotative movement only, without necessitating any axial shifting movement, thereby simplifying the operation of setting these two dials.

Another object of the invention is to provide a range timer in which the stop cooking dial can be turned either clockwise or counter clockwise from any position, in setting up the stop cooking time on the range timer.

Another object of the invention is to provide a range timer wherein the cooking hours dial is provided with the usual series of numerals designating the number of hours in the cooking operation; and also has in addition thereto a first designation denoting the "Off" position of the switch, and a second designation denoting the "Manual" or on position of the switch. This operating characteristic is obtained by forming on the back side of the internal ring gear of the planetary system an arrangement of rotatable cam surfaces, which rotate directly with the internal ring gear, as though made a part of a separate cam wheel. Cooperating with and made responsive to these rotatable cam surfaces is a system of levers which perform the two-fold functions of: (1) causing the previously described axial shifting motion between the tripping slots carried by the time driven wheel and the tripping lugs carried by the planetary pinion spider or carrier; and (2) causing the electric switch to move into the off position and into the on position when the cooking hours dial is rotated to move the above "Off" designation or the above "Man" designation into operative or viewing position.

In this regard, it is a further, more specific object of the invention to have the mechanism so constructed that when the cooking hours dial is manually turned in one specific direction (such as counterclockwise), as from the "Manual" position through the "Off" position, and is further continued into the cooking hours scale on the dial, such rotation will immediately cause the range timer to go into "set" position automatically without the performance of any other control operation.

Another more specific object in this regard is to construct the mechanism so that the cooking hours dial is time driven, immediately after the timed start of the cooking period, in a reverse direction (clockwise), hour for hour, concurrently with the hour hand of the clock, to the above-described "Off" position, at which point the electrical switch is automatically opened for stopping the cooking operation. The electrical switch then remains in the "Off" position until the cooking hours dial is manually turned clockwise into the "Manual" position which closes the range timer switch so that the circuit of the range or oven is thereafter responsive to the manual switch of the range or oven, or to the conventional thermostatic switch with which these ranges or ovens are usually supplied.

A further object of the invention is to provide an improved arrangement of indicating flag which shows distinctive indicating colors in a sight window when the range timer switch is either in its closed position or in its open position.

A further object of the invention is to provide such timing mechanism with a unique interval timer embodying one dial for indicating a fast time interval of short time duration, and another dial for indicating a slow time interval of long time duration, and wherein both of these two interval timer dials are mounted concentrically on the same axis and are both arranged to be set by the same setting knob.

A still further object is to provide timing mechanism of the above general description wherein the basic mechanism is of low manufacturing cost, this resulting largely from the use of the planetary gear system.

Other objects, features and advantages of the invention will appear from the following detailed description of one preferred embodiment thereof. In the accompanying drawings illustrating such embodiment:

FIGURE 1 is a front elevational view of a timing device embodying the invention;

FIGURE 2 is a rear elevational view of the same;

FIGURE 3 is an end elevational view of the left hand end of the timing device, as viewed from the left hand end of FIGURE 1, with the cover glass illustrated in dotted lines;

FIGURE 4 is a view of the right hand end of the device as viewed from the right hand end of FIGURE 1;

FIGURE 5 is a front view of the timing device with the dial plate removed to show the operating parts located in the space between the front dial plate and the front frame plate, this figure corresponding approximately to a section taken on the plane of the lines 5—5 of FIGURES 3 and 4;

FIGURE 6 illustrates the front portion of an exploded perspective view showing most of the front parts of our improved timing mechanism;

FIGURE 7 is a rear portion of this exploded perspective view as extended to show most of the rear parts of our improved timing mechanism;

FIGURE 8 is a right hand end view somewhat comparable to FIGURE 4, but being on a larger scale and being partly broken away in section, this view illustrating the position of the parts with the electrical switch closed;

FIGURE 9 is a view similar to FIGURE 8 but illustrating the position of the parts when the electrical switch is in the open circuit position;

FIGURE 10 is a fragmentary sectional view on a larger scale taken axially through the planetary gear system, approximately on the planes of the lines 10—10 of FIGURES 5, 14, 15 and 16;

FIGURE 11 is another fragmentary sectional view of the planetary gear system, taken on the plane of the line 11—11 of FIGURE 10;

FIGURE 12 is a detail elevational view of the planetary gear system, taken approximately on the plane of the line 12—12 of FIGURE 9;

FIGURE 13 is a fragmentary sectional view taken approximately on the plane of the line 13—13 of FIGURE 8;

FIGURE 14 is a fragmentary sectional view looking rearwardly from the plane of the line 14—14 of FIGURE 8, which section plane lies forwardly of the front frame plate;

FIGURE 15 is a fragmentary sectional view looking rearwardly from the plane of the line 15—15 of FIGURE 9, which section plane lies rearwardly of the front frame plate;

FIGURE 16 is a fragmentary sectional view similar to FIGURE 15, but showing the position of the parts when the cooking hours dial has been turned to the "Manual" position.

FIGURE 17 is a fragmentary sectional view through part of the interval timer, taken approximately on the planes of the lines 17—17 of FIGURES 5 and 18; and FIGURE 18 is a transverse sectional view through the interval timer, taken approximately on the plane of the line 18—18 of FIGURE 17.

Referring first to FIGURE 1, our improved timing mechanism comprises a front face or dial plate 30 on which are compactly arranged the clock dial, the interval timer sight window and setting knob, the stop time sight window and setting knob, and the cooking hours sight window and setting knob. The clock dial comprises hour numerals 32, which for greater compactness are preferably arranged in a rectangular grouping, and in front of which revolve an hour hand 33, a minute hand 34 and a sweep second hand 35. The time setting of the hour and minute hands can be corrected or set by rotating a small clock setting knob 37 mounted on a clock setting shaft 38 located centrally below the clock dial.

The interval timer mechanism comprises an "Internal Timer" designation 41 below which is an arcuate sight window 42 punched out of the dial plate 30 and provided with a centrally located lower index marker 43. Rotating behind this sight window for registration with such index marker is an arrangement of short and long interval timing dials 45 and 46. The setting of this interval timer is effected through the rotation of a knob 47 secured to a setting shaft 48 located directly below the interval timer sight window 42. The details of this interval timer mechanism will be described after the description of the range timer mechanism.

Referring now to the range timer setting controls, these comprise a centrally located "Stop Time" designation 51, below which another arcuate sight window 52 is punched out of the dial plate 30 and is also provided with a centrally located index marker 53. Rotating behind this sight window 52 for registration with such marker is a stop time dial 54 bearing time markings and time numerals designated 56, these numerals having the same clock scale ranging from 1 to 12 inclusive and filling the entire circle of the dial 54. The stop time settings are effected by the rotation of a relatively large knob 57 which is located directly behind the clock setting knob 37, and is mounted on a sleeve 58 which surrounds the outer portion of the clock setting shaft 38. The inner end of the setting sleeve 58 carries a pinion 59 which meshes with spur teeth 60 (FIG. 5) formed around the periphery of the stop-time dial 54 for adjustably rotating the latter from the setting knob 57. As will later appear, the stop-time dial 54 has rotative mounting on an axially shiftable pivot stud 108 which is spring urged in a rearward direction to hold the dial pressed rearwardly in firm frictional engagement against the front face of the front frame plate 80 so as to continuously impose a resilient frictional detent action on this stop-time dial 54 for holding it in its manually set positions.

The range timer controls also include a "Cooking Hours" designation or indicia 61, adjacent to the right hand edge of the dial plate 30, and below which is a third arcuate sight window 62 punched out in the dial plate 30 and also provided with a lower index marker 63. Rotating behind this sight window 62 is a cooking hours dial 64 bearing fractional hour and full hour time markings and time numerals designated 65, the range of these latter numerals extending from approximately 1 to 6 inclusive, and covering an angular span of approximately 270° of the dial face 64. Imprinted on this dial face between the beginning and the ending of this cooking hours scale is an "Off" designation 66 and a "Man" designation 66' (see FIGURE 5), the latter being an abbreviation indicating that the range timer is in the Manual position. The cooking hours settings are effected by rotation of a knob 67 secured to a rotatable setting shaft 68 located below the cooking hours sight window 62. This shaft 68 carries a pinion 69 which meshes with spur teeth 70 formed part-way around the periphery of the cooking hours dial 64 for adjustably rotating the latter, the dial having a narrow sector 70' between the end of the numbered scale and the "Man" designation, where the dial extends out to the tooth tip diameter but is devoid of spur teeth 70. This cooking hours dial 64 has rotative mounting on a bearing stud 71 having support in the front frame plate 80.

Located centrally of the upper portion of the dial plate 30, preferably directly below the numeral "12" of the clock dial is a small rectangular sight window 72, behind which the red target area 73 of a movable flag 74 (FIGURE 5) is adapted to be presented whenever the cooking hours dial 64 has been placed, with either the numbered scale portion 65 or the "Man" designation 66' thereon appearing in the sight window 62.

Disposed in front of the dial plate 30 and clock hands 33–35, etc. is a conventional cover glass 75 having appropriate openings for passing the setting shafts 38, 48, 58 and 68 therethrough so as to dispose the setting knobs 37, 47, 57 and 67 in front of this cover glass. In some installations, this cover glass may be mounted in a separate bezel frame secured to the main frame structure of the timing mechanism; and in other installations the cover glass may be mounted in a rectangular opening formed in the back instrument panel of the cooking range.

As illustrative of the very compact size of our improved construction of timing mechanism, the standard commercial units thereof have an exposed area of cover glass 75 or dial plate 30 which is approximately 3 inches in height and approximately 5 inches in length.

Referring now to the frame structure, and to the operating parts of the oven timer, the frame structure comprises a front frame plate 80 and a rear frame plate 81 which are fastened together in spaced relation through the medium of mounting extensions or flanges 82, 83, etc. These mounting extensions are bent forwardly from the upper and lower edges of the rear frame plate 81 and have tongues 82', 83' which pass through mounting slots in the front frame plate 80, these tongues being staked or bent over on the front side of the front mounting plate. Bent forwardly from the upper and lower edges of the front frame plate 80 are narrow spacing lips or flanges 85, 86, against which the back surface of the front dial plate 30 bears, thereby maintaining a relatively narrow clearance space 87 (FIGURES 8 and 9) between the front dial plate 30 and the front frame plate 80. Disposed in this narrow clearance space 87 are the interval timer dials 45, 46, also the stop time dial 54 and setting pinion 59, the cooking hours dial 64 and the front end of its setting pinion 69, together with the indicating flag 74. All of the sight windows are punched out in the face or dial plate 30. This face or dial plate 30 and the front frame plate 80 are held together by tongues or lugs 88 and 89 which extend from the upper and lower edges of the dial plate 30 and are bent rearwardly over against the back side of the front frame plate 80.

Mounted on the rear frame plate 81 adjacent one end thereof is the synchronous electric motor 91 which drives all of the operating parts, and mounted on this frame plate adjacent to the other end thereof is the electrical contact switch 92 which controls the oven, either of the electrically heated type or the gas heated type. The synchronous motor unit 91 is secured to the rear frame plate 81 in any desired manner, such as by having screws 94 pass through apertured lugs or ears 95 projecting outwardly from the base of the motor. Extending from the base portion of the motor unit 91 is a housing 96 embodying a train of speed reducing gearing which transmits a drive from the rotor of the synchronous motor to a power take-off shaft 97 which extends forwardly through the rear frame plate 81. The forward end of the latter motor take-off shaft, at a point beyond the rear frame plate 81, mounts a pinion 98 (FIGURE 13) which transmits a continuous time driven rotation to the hour hand 33, minute hand 34, and sweep second hand 35. This time driven rotation occurs through any conventional arrangement or assembly of clock train gearing, which we have typically illustrated by the gears, pinions and pivots 101–109, which clock train gearing is best shown in FIGURE 13, and serves to transmit continuous time driven rotation at appropriate speeds to the hour hand arbor 112, the minute hand arbor 113 and the second hand arbor 114. The clock setting shaft 38 carries a pinion 115 adjacent to its inner end which is operable to transmit clock setting rotation from the setting knob 37 to the clock hands through meshing engagement with the gear 107, and thus through the exemplary form of clock train gearing (FIGURE 13). A conventional friction slippage clutch, diagrammatically indicated at 116 in FIGURE 7, is interposed in the train of clock gearing between the continuously rotating pinion 98 of the synchronous motor and the aforesaid clock arbors, so as to permit setting of the clock hands without transmitting such setting rotation back to the rotor of the clock motor through the large ratio reduction gearing in the motor unit housing 96. These friction slippage clutches are old and well known.

Arranged to be continuously driven by the clock train gear 107 is a relatively long continuously rotating pinion 118 which lies parallel with and directly below the concentric axes of the clock hands and arbors, and has rotative mounting on the pivot stud 108 which is shiftably and rotatably mounted in both the front and rear frame plates 80 and 81 (see FIG. 10). This shiftable stud 108 produces the aforementioned frictional detent action on the stop-time dial 54 to hold the dial frictionally in its different manually adjusted positions. A compression spring 122 on this pivot stud 108 reacts at its front end against the back side of the front frame plate 80 and at its rear end against a washer 122' bearing against a shoulder 108' (FIGURE 7) on stud 108. The stud 108 then transmits the pressure of the spring 122 forwardly through the front frame plate 80 and through the stop-time dial 54 to a friction bushing 123 which has a frictional flange bearing against the front side of the dial 54, the stud being secured to this bushing by a C-shaped or E-shaped retaining washer 123a. The bushing 123 is held against rotation by opposite fingers 123b which extend inwardly from the bushing into diametrically opposite slots in the front frame plate. The stop time dial 54 also has its rear face pressed rearwardly by the action of the spring 122 against frictional protuberances 124 projecting slightly forwardly from the front frame plate 80 (FIGURE 10). Thus, frictional detent forces act against both the front and rear sides of the stop time dial 54.

The pinion 118, continuously driven from the clock train gearing, meshes with the toothed periphery of a relatively large time-driven tripping gear 125 which has continuous time driven rotation about an independently rotatable planetary gear carrier mounting shaft 126 which extends transversely of the frame plates approximately midway between but below the axis 108 of the stop dial 54 and below the axis 71 of the cooking hours dial 64. This shaft 126 has its rear end rotatably mounted in the rear frame plate 81, and its front end in a sun gear stud, to be later described. In addition to being continuously time driven from the clock train gearing, this large gear wheel 125 is adapted to have axial shifting movement on the rear portion of the carrier mounting shaft 126, this axial shifting movement being for the purpose of establishing a clutching or positive locking engagement between such time driven wheel 125 and a planetary gear spider or carrier 130 which is secured fast to the carrier mounting shaft 126. This positive locking engagement resulting from forward shifting of the wheel 125 automatically determines the time when the cooking operation is to start, and the automatic release of the locking or clutching engagement caused by rearward shifting of the time driven wheel 125 terminates the cooking operation at the time which has been set up on the stop time dial 54. Surrounding the carrier mounting shaft 126 between the front side of the axially shiftable time driven wheel 125 and the opposing rear side of the planetary gear carrier 130 is a conically coiled compression spring 130′ which normally tends to shift the time driven wheel 125 rearwardly out of positive clutching engagement with the planetary gear carrier. Anchored to the back side of the shiftable time driven wheel 125 is an annularly grooved shifter collar 127 which receives shifting movement from the lever system, to be later described.

Referring now to the manner in which the above positive locking and unlocking is accomplished, it will be seen from FIGURE 13 that the time driven wheel 125 has two tripping slots 128 and 129 punched entirely therethrough at diametrically opposite points of the time driven wheel; and attention is directed to the fact that the tripping slot 128 is located at a radius r from the center of the gear wheel 125, and that the other tripping slot 129 is located at a substantially greater radius r′ from the center of this notched time wheel. Once in every 12 hours, these tripping slots 128 and 129 are adapted to rotate into registration with two upstanding tripping lugs 131 and 132 (FIGURES 9 and 10) which project rearwardly toward the forward face of the slotted time driven wheel 125. These rearwardly projecting tripping lugs are bent from the ends of two diametrically opposite arms 134 and 136 of the three-arm planetary spider or carrier 130. These two diametrically opposite upstanding tripping lugs 131 and 132 are also located at the aforementioned differential radii r and r′ described above in connection with the tripping slots 128 and 129, so that these tripping lugs can only snap into the slots once in every 12 hours, whereby two separate cooking operations cannot be accidentally started and stopped automatically during the course of a single day. The tripping lugs 131 and 132 have a relatively snug fit within the tripping slots 128 and 129 for obtaining close accuracy in the automatic control times of the cooking operation.

Referring now to the unique employment of the planetary gear system, this includes as one component part of the system the above mentioned three-arm planetary carrier 130, the latter being fixedly mounted on the above carrier shaft 126. As previously described, the rear end of this carrier shaft 126 has rotatable mounting in a bearing hole in the rear frame plate 81, and the front end has rotatable mounting in a bearing hole 137′ formed in a sun gear stud 137 (FIGURE 10). This sun gear stud 137 has rotatable mounting in a stationary bearing bushing 137a anchored in the front frame plate 80. Secured fast to the front end of this sun gear stud 137 is a front pinion 138, and secured fast to the rear end of this stud is the sun gear 140 of the planetary gear system. The spur teeth of the front pinion 138 have permanent mesh with the spur teeth 60 formed around the outer periphery of the stop time dial 54. Hence, it will be seen that each and every angular adjustment given to the stop time dial 54 through manual rotation of the stop time setting knob 57 is immediately transmitted through the front pinion 138 and sun gear stud 137 to the sun gear 140, whereby the angular position of the sun gear 140 is a constant index of the stop cooking time which has been set up upon the stop time dial 54.

Referring particularly to FIGURES 11 and 12, it will be seen that the spider or carrier 130 has a third or intermediate carrier arm 141 projecting therefrom, and extending from this arm is a pivot pin 143 on which is rotatably mounted the planetary gear or pinion 144 of the planetary system PG. This planetary pinion 144 meshes with the sun gear 140, and swings in an arc or orbital path around the sun gear 140 while remaining in continuous mesh therewith. Hence, all rotation transmitted from the stop cooking dial 54 to the sun gear 140, as above described, will be transmitted by way of the sun gear 140 to the planetary pinion 144 for swinging the latter in its orbital path, the outer planetary ring gear 150 remaining stationary at this time. Thus, it will be seen that any and all stop cooking adjustments which the housewife sets up on the stop cooking dial 54 will be immediately transmitted to the planetary pinion 144 for causing it to assume a position in its orbital path of movement around the sun gear 140, corresponding to the setting given the stop cooking dial 54.

Referring now specifically to the third principal element of the planetary gearing PG, i.e. to the outer internal ring gear 150 which concentrically surrounds the sun gear 140 and the planetary pinion 144, it will be seen from FIGURES 10–12 that this outer internal ring gear 150 comprises a web portion 151 having a large central aperture therein, which has rotatable bearing mounting over the outside cylindrical surface of the stationary bearing bushing 137a, in which is rotatably mounted the sun gear stud 137. Projecting rearwardly from the periphery of the web 151 is an annular flange 155 which defines a circular cavity in this face of the ring gear 150 in which rotate the sun gear 140 and planetary pinion 144. Formed around the inside of this annular flange 155 are the spur teeth of an internal planetary gear 156 with which the teeth of the planetary pinion 144 remain in constant mesh, either in the orbital motion of the planetary pinion 144, or in the outside circular movement of the outer planetary ring gear 150. Formed around the outside of this annular flange 155 are the spur teeth of an outer external ring gear 157. Meshing with this outer ring gear 157 is the aforementioned setting pinion 69 which meshes with the toothed periphery of the cooking hours dial 64, and sets up the different desired cooking hours times on said dial. The setting pinion 69 is of sufficient length to mesh with the spur teeth 70 of the cooking hours dial on the front side of the front frame plate 80, and also to mesh with the outer spur teeth 157 of the planetary ring gear 150 on the inner side of this front frame plate. It will thus be seen that the planetary ring gear 150 is positively and permanently tied to the cooking hours dial 64, so that it will always have concurrent rotation therewith whenever the cooking hours knob 67 and cooking hours dial 64 are rotated.

It is appropriate to describe at this point that although the numerals on the stop time dial 54, and on the cooking hours dial 64, both progress in the same direction (i.e. the numerals on the stop time dial 54 progress from 1 to 12 in a clockwise direction, and the numerals on the cooking hours dial 64 progress from 1 to 6 also in a clockwise direction), nevertheless these two dials transmit opposite directions of rotation to those elements of the planetary gearing PG that are responsive thereto as these dials are rotated in either numerical increasing or decreasing directions. That is to say, the rotation of the stop time dial 54 in a counterclockwise direction from a lower number to a higher number operates to revolve the planetary system sun gear 140 in a clockwise direction; whereas the rotation of the cooking hours dial 64 in a similar counterclockwise direction from a lower number to a higher number operates to drive the outer ring gear 150 of the planetary system in a counterclockwise or opposite direction—oppositely to the direction of the sun gear 140, which rotates whenever the stop-time dial is rotated, is mounted on the same axis with the sun gear 140 and drives the latter directly; whereas the driving pinion 69 which rotates whenever the cooking hours dial 64 rotates or is rotated, is not mounted on the same axis with the ring gear 150, but drives the latter indirectly through the interposed meshing sets of gear teeth 69 and 157. The planetary gear or pinion 144 accordingly responds differentially to the rotary movement of the sun gear 140 and the outer ring gear 150, and hence this planetary pinion 144, together with the spider or carrier 136 and diametrically opposite tripping lugs 131, 132 responds differentially to the settings which have been given the stop time dial and the cooking hours dial. Thus, the planetary pinion 144 and the tripping lugs 131, 132 revolve through a degree of arc which corresponds to the number of hours that the cooking hours time (dial 64) subtracts from the stop cooking time (dial 54), and this operates to locate the starting or start cooking position of the tripping lugs 131, 132.

Referring now to the lever system which responds to the cam surfaces formed on the cam gear 150' projecting integrally from the forward face of the planetary ring gear 150, this lever system comprises: a first cam responsive lever 165 which is directly responsive to these cam surfaces; a second lever 166 which is responsive to the first lever 165; a third lever 167 which is actuated by the second lever 166; and a fourth lever 168 (FIGURES 8, 9 and 13) which is also actuated by the second lever 166. The first or primary cam responsive lever 165 has pivotal mounting on the aforementioned bearing stud 71 which is anchored in the front frame plate 80, for pivotally mounting the cooking hours dial 64, and which has an enlarged head on the back side, whereby said pivot stud also functions as the pivot for the first lever 165 and for the second lever 166. The left hand arm of this first lever 165 overlies the forward cam bearing face of the cam wheel 150', and carries a cam follower pin 171, which responds to different cam surfaces formed in the forward face of the planetary ring gear 150, which cam surfaces may be likened to a separate cam wheel 150' rotating synchronously with the planetary ring gear 150, and formed integral therewith. The cam surfaces in such forward face of the cam wheel 150' to which this pin 171 responds, include an outer circular cam ledge 174 which is formed concentrically of the cam wheel. Extending inwardly from one point of this circular ledge cam 174 is a cam slot 175 which approaches the center of the cam bearing wheel along a line slightly to the left of the radial. The inner end of this cam slot 175 has an abrupt stop shoulder, and extending laterally to the left therefrom is a cam pocket 177. The left hand edge of the inwardly extending cam slot 175 leaves the circular cam ledge 174 with a relatively abrupt drop-off shoulder 179. On the other side, the right hand edge of this cam slot 175 joins the cam ledge 174 through a gradually rounded or sweeping curve 181. The purpose of this sweeping curve 181 is to reduce the turning torque which must be exerted on the knob 67 when turning the cooking hours dial 64 from the "Off" position to a cooking hours designation, at which time the cam follower pin 171 is being forced out along the right hand edge of the cam slot 175 up on the cam ledge 174. The cam face of this cam wheel 150' is spaced slightly from the back surface of the front mounting plate 80, by the bushed mounting of the planetary ring gear, which will be later described, so as to accommodate a pivotally swinging cam slot adjusting segment 182 (FIGURES 15 and 16) for pivotal swinging movement between the front face of the cam wheel and the back surface of the mounting plate. The pivotal mounting of this adjusting segment 182 is established by a partly formed pivot loop 184 on the segment 182 which pivotally encircles the mounting hub of the planetary gear wheel, etc. The pivotal motion which the adjusting segment 182 can have relatively to the cam wheel slot 175 is limited by an arcuate lost motion slot 186 formed in the segment 182 and engaging over a pin 187 carried by the cam wheel. The left hand edge of the automatic adjuster segment 182 has an overhang 188 which is adapted to swing across and cover the sweeping curved entrance edge 181 to the cam slot 175, when the planetary gear and cam wheel 150 are being revolved in a clockwise direction (FIGURES 14, 15 and 16), thereby resulting in a narrowing or constricting of the upper end of the cam slot 175 to form a relatively sharp drop-off shoulder along the right hand edge of the slot 175 when the cooking hours dial 64 rotates backwardly automatically into the "Off" position, under the restoring rotation of the constantly rotating time driven gear 125. Formed along the outer periphery of the adjusting segment 182 is a riding surface 191 which has substantially the same radius as the circular cam ledge 174. Extending for a short distance to the right of the entrance curve 181, the radius of the circular cam ledge 174 is diminished slightly as shown at 174' (see FIGURE 5), so that when this part of the cam wheel is presented to the follower pin 171 in a clockwise direction of rotation of the cam wheel, the pin will ride off the slightly smaller radius ledge surface 174' and onto the slightly larger radius 191 of the adjuster segment 182 for swinging the adjuster segment 182 into the position shown in FIGURE 15 where it restricts the throat opening to the cam slot 175. Thus, in any clockwise rotation of the cam wheel which will carry the cam slot 175 into registration with the cam follower 171, the friction exerted by the cam follower 171 in riding up onto the peripheral surface 191 will swing the adjuster segment 182 in a counterclockwise direction through the limited arc permitted by the lost motion slot 186 so as to restrict or reduce the entrance throat of the cam slot 175 for obtaining a relatively quick drop of the cam follower pin 171 into the cam slot 175 in such clockwise rotation of the cam wheel.

The manual rotation of the cooking hours dial 64 in a counterclockwise direction to present any desired one of the cooking hour numerals in registration with the index marker 63 moves the circular cam ledge 174 under the cam follower pin 171, so that at this time the primary cam responsive lever 165 has been swung clockwise into the position shown in FIGURE 14. During the cooking operation, the cooking hours dial 64 is rotated reversely in a clockwise direction, hour by hour, corresponding to the motion of the clock hour hand 33, until at the conclusion of the cooking operation the cam slot 175 comes into position under the cam follower pin 171, with the slot adjusting segment 182 in position to give a sharp drop-off to the pin 171 at the "Off" position. Thereupon, the cam follower pin 171 swings inwardly into the cam slot 175 with a quick motion, and swings the primary lever 165 in a counterclockwise direction, which motion of the primary lever 165 results in the movement of the electrical switch 92 into its off position. As above remarked, the "Off" designation 66 comes into registration with the index marker 63 at this time. The cooking operation is now concluded, and the range timer switch 92 is in its off or open position. Thereafter, if the housewife desires to place the range timer switch 92 in the "Manual" position, she rotates the cooking hours dial 64 one more step in a clockwise direction to bring the next designation "Man" 66' into registration with the index marker 63. The resulting rotation of the inwardly extending cam slot 175 in a clockwise direction from the position shown in FIGURE 15 to the position shown in FIGURE 16, forces the cam follower 171 down into the bottom end of the cam slot 175 and also forces the cam pocket 177 over the cam follower 171, into the position shown in FIGURE 16. This revolves the primary lever 165 still further in a counterclockwise direction, thereby resulting in the closing of the electric switch 92, in a manner to be later described. As shown in FIGURE 14, the front frame plate 80 has a relatively large opening 193 punched therethrough adjacent to the left hand arm 165a of primary lever 165 which carries the cam follower pin 171, and this arm of the lever is offset or bent forwardly so as to lie in the opening 193, and thus operate substantially in the plane of the front frame plate 80. The primary lever 165 also has an arm 165b extending toward the right, and hooked to the underside of this arm is an upwardly extending tension spring 195 which normally biases the cam follower 171 in a downward direction so as to maintain it in engagement with the cam surfaces. A relatively large opening 196 punched out of the front frame plate 80 serves to accommodate part of the diametrical thickness of the spring 195.

Referring now to the second lever 166, which is also pivoted on the pivot stud 71, this second lever has a lost motion connection with the primary lever 165, comprising an arcuate slot 197 in the lever 165 engaging over a limiting pin 198 carried by the second lever 166. Extending to the right from the upper portion of the second lever 166 is an arm 166a, to which the upper end of the tension spring 195 is hooked, whereby the tension of such spring normally holds the pin 198 up against the upper end of the lost motion slot 197.

Formed in the upper portion of the secondary lever 166 is a cam slot 201 of inverted V-shape. Responding to such cam slot 201 is a cam follower roller or pin 202 which projects forwardly from the lower arm 167a of the third lever 167. The cam follower roller 202 is mounted on a transverse pin 203 carried by the lower lever arm 167a, the forward end of such pin 203 projecting beyond the plane of the front frame plate 80 for actuating the indicator flag, which will be later described. The lever 167 extends inwardly and has an apertured end 167b which has pivotal mounting over the arbor assembly 112–114. The lever is also formed with an upper arm 167c, from the end of which a switch actuating lug 204 is bent in a rearward direction. This lug 204 is adapted to engage a switch actuating arm 205 projecting forwardly from the electric switch 92, as best shown in FIGURES 8 and 9. Referring first to FIGURE 8, when the lever 167 swings downwardly the lug 204 is also moved downwardly, thereby swinging the switch actuating arm 205 into the switch closing position. Conversely, when the lever 167 swings upwardly the lug 204 is moved upwardly correspondingly, as shown in FIGURE 9, so that the switch actuating arm 205 can swing upwardly to the switch opening position. Referring now to FIGURE 14, when the cam follower roller 171 is riding on the cam ledge 174 of the combined cam and planetary gear wheel the secondary lever 166 has been swung into such position as to bring the cam follower roller 202 into the left hand end of the inverted V-shaped cam slot 201, this corresponding to the switch closed position which occurs while the cooking hours dial 64 is slowly rotating backwardly in a clockwise direction during the cooking operation, towards its "Off" position. FIGURE 15 illustrates the position of the parts when the cooking hours dial has arrived in the switch "Off" position, at which time the cam follower roller 202 occupies a position substantially at the peak of the inverted V-shaped cam slot. FIGURE 16 shows the next position of the parts when the cooking hours dial has been rotated into its "Manual" position, with the cam follower 171 engaging in the offset cam pocket 177. At this time, the other cam follower 202 is engaging in the lower right hand end of the inverted V-shaped cam slot 201, in which position the lever 167 has been swung downwardly for moving the electrical switch into its closed position.

Referring now to the fourth lever 168 which responds to the lost motion pin 198 of secondary lever 166 for effecting the axial shifting movement of the slotted time driven gear wheel 125, this lever is of approximately bellcrank outline, comprising two arms 209–210 (FIGURES 8 and 9) and substantially at the juncture of these two arms the lever is formed with a projecting pivot tab 211 which projects rearwardly through a pivot slot 212 formed in the back frame plate 81. The forwardly extending arm 209 has a laterally bent lug 214 (FIGURE 13) which is apertured to engage over the projecting rear end of the pin 198 carried by the second lever 166. When this second lever 166 swings into the different positions shown in FIGURES 14, 15 and 16, the bell-crank or fourth lever 168 is oscillated around its pivot tab 211 (FIGURES 8 and 9). The downwardly extending arm 210 of this bell-crank lever has an inwardly projecting lug 216 at its lower end which extends into the grooved shift collar 127 provided on the back side of the slotted time driven gear 125. When the primary and secondary levers 165 and 166 move into the positions shown in FIGURE 14, the bell-crank lever 168 is rocked to cause its lower arm 210 to thrust forwardly on the slotted time driven gear 125, whereby the forward face of this slotted gear 125 is pressed forwardly against the ends of the tripping lugs 131 and 132 projecting from the planetary gear carrier 130. Accordingly, under this condition, when the slots 128–129 in the continuously rotating time driven wheel 125 come into registration with the tripping lugs 131 and 132 on the planetary gear carrier, the interlocking relation between the slots and lugs will occur. Conversely, when the primary and secondary levers 165–166 occupy the positions shown in FIGURE 15, the bell-crank lever 168 is swung in the reverse direction to move the slotted time driven gear 125 rearwardly out of the rotative path of the tripping lugs 131 and 132 on the planetary pinion carrier.

With regard to the movement of the bell-crank lever 168 into the position shown in FIGURE 8, for shifting the slotted time driven wheel 125 forwardly where the tripping slots 128—129 in said wheel can snap into clutching engagement over the tripping lugs 131—132 projecting rearwardly from the planetary gear carrier 136, it will be obvious that in the normal operation of setting the range timer, the flat front face of the slotted time driven wheel will ordinarily abut the ends of the tripping lugs 131—132, and that some greater or less range of idling or time driven rotation of the slotted time driven wheel 125 will be necessary to bring the tripping slots 128—129 into registration with the tripping lugs 131—132, such registration establishing the start cooking time of the range timer. When the aforesaid abutment occurs between the flat face of the time driven wheel and the tripping lugs 131—132, there should preferably be some resilient or yielding connection in the lever system to hold the face of the time driven wheel 125 pressed resiliently against the tripping lugs 131—132, preparatory to the tripping slots 128—129 rotating into position for snapping forwardly over the tripping lugs. This resilient connection resides in the lost motion connection between the first lever 165 and the second lever 166, in the form of the arcuate slot 197 and pin 198, taken in conjunction with the tension spring 195. When the flat face of the time driven wheel 125 is blocked against its full range of forward movement by the trippings lugs 131—132, the lost motion connection 197—198 permits relative pivotal motion between the first and second levers 165 and 166, opposed by the tension spring 195.

When the tripping slots 128—129 snap forwardly over the tripping lugs 131—132, the second lever 166 swings clockwise relatively to the first lever 165 for bringing the stop pin 198 back up into the upper end of the lost motion arcuate slot 197, and the increased pull on the tension spring 195 is relieved. It will be remembered that the stop pin 198 is mounted in and secured to the second lever 166, and it is the inwardly projecting end of this stop pin 198 that actuates the bell-crank shifter lever 168 (FIGURE 13).

The electrical switch 92 can be of any desired or conventional construction. In the exemplary form illustrated, the switch actuating arm 205 is in the form of an insulating projection extending forwardly from the center of an insulating yoke 222 which, as shown in FIGURES 8 and 9, has rocker or tiltable mounting on a fulcrum wedge 223 projecting forwardly from the insulating base molding of the switch. The lower arm 222b of this yoke carries either one or a pair of horizontally spaced shiftable rods 224 passing therethrough at opposite ends of the yoke arm 222b, each of these rods having its opposite ends headed and provided with a compression spring 224a which normally holds a contact bridging bar 225 pressed rearwardly in position to establish spanning contact across a pair of stationary electrical contacts 226 located on opposite sides of the lower yoke arm 222b. Outer connector terminals 227 connect with the stationary electrical contacts 226. When the yoke 222 is in the position shown in FIGURE 8 the movable bridging contact 225 is closing the circuit through the stationary contacts 226, and when the yoke is in the position shown in FIGURE 9 the contacts are separated. Passing through the upper arm 222c of the yoke is a double headed spring rod 228 which carries a compression spring 229 for normally biasing the rocker yoke 222 into the open circuit position shown in FIGURE 9.

With respect to indicating when the cooking range or oven is under automatic control, it will be seen from FIGURE 5 that the movable flag 74 has an upper black or gray target area 73a, and has a lower red target area 73' at the elbow portion of the flag 74, these two target areas being adapted to be successively presented behind the sight window 72 in the front dial plate. The flag 74 is pivotally mounted at an intermediate point on a pivot projection 231 extending forwardly from the front frame plate 80, and the lower end of this flag 74 is provided with a longitudinally extending slot 232 which engages constantly over the forward front end of the cam roller pin 203. Thus the flag 74 responds to the movement of the cam follower roller 202 in the different positions that it assumes in the inverted V-shaped cam slot 201 in the second lever 166.

We shall now briefly describe the steps to be followed by the housewife in setting up the automatic conditions on our improved range timer, namely the stop cooking time and the cooking hours time. The housewife first rotates the setting knob 58 to rotate the stop time dial 54 whereby to bring the desired stop cooking hour designation into registration with the index marker 53. This setting of the stop cooking time can be performed by the housewife rotating the stop time dial 54 in either a clockwise or a counter clockwise direction, which substantially simplifies the setting operation because the housewife does not have to remember to turn the stop time dial in one specific direction or the other. This operation of setting up the stop time is preferably performed before the operation of setting up the cooking hours time, and it serves to first locate the planetary pinion 144 at a particular point in its orbital path, corresponding to the stop time selected.

Thereafter, the housewife proceeds to set up the cooking hours time on the cooking hours dial 64 by the rotation of the cooking hours setting knob 67. In its normal position, the cooking hours dial 64 stands either in its "Off" position or in the "Man" position, and the housewife rotates this dial 64 in a counter clockwise direction to bring the designation of the desired number of cooking hours into registration with the index marker 63, rotation of the cooking hours dial 64 in a clockwise direction from the "Man" position being precluded because at this time the cam follower pin 171 is deep down in the cam slot 175, and within the offset recess 177 at the bottom end of said slot. The rotation of the cooking hours dial 64 in the proper counter clockwise direction to bring the desired cooking hours designation into registration with the index marker 63 swings the cam follower roller 171 upwardly out of the cam slot 175 and upon the cam ledge 174. At this point we wish to again direct attention to the fact that such rotation of the cooking hours dial 64 in a counter clockwise direction to any numbered part of its cooking hours scale automatically places the range timer in a "set" condition with the front face of the slotted time driven wheel 125 pressed resiliently forwardly against the ends of the tripping lugs 131 and 132, preparatory to starting the cooking operation at the start cooking time, which has been automatically computed by the orbital motion which has been transmitted to the planetary pinion 144 by the stop cooking time set up on the dial 54, and by the orbital motion which has been transmitted to this planetary pinion 144 in a subtracting direction by the number of cooking hours that have been set up on the cooking hours dial 64. Thus, the placing of the range timer in its set condition occurs automatically when setting up the cooking hours time, without requiring the housewife to perform any separate timer "setting" operation. As the cooking operation continues, the cooking hours dial 64 automatically rotates in a reverse or clockwise direction, hour by hour concurrently with the hour hand 33 of the clock, and this continues until the cooking hours dial 64 reaches the "Off" position, at which point the cam follower pin 171 enters the inwardly extending cam slot 175 and thereby opens the electric switch 92.

Referring now to FIGURES 17 and 18 which show our improved interval timer characterized by one timer dial for indicating a fast time interval of short time duration, and by another timer dial for indicating a slow time interval of long time duration, the interval timer setting shaft 48 has bearing support in the front and rear frame plates 80 and 81, and between these plates the shaft 48 carries a pinion 235. Meshing with this pinion 235 is a relatively large gear 237 having a reduction pinion 106 secured thereto, and both mounted on a transverse shaft 105 (FIGURE 13). In response to the turning motion of the interval timer setting shaft 48, the relatively large gear 237 transmits rotation to a pinion 241 at an advanced rate, and the concentric pinion 106 transmits rotation to a gear 242 of a compound gear 243 at a slower rate, the pinion 241 and the compound gear 242—243 both being mounted on the concentric axes of the two interval timer dials 45 and 46. The relatively high speed pinion 241 is mounted on a sleeve 244 which extends through the front mounting plate and mounts the high speed dial 45 on its front end. The concentric slow speed compound gear 243 is secured to a central shaft 245 which extends axially through the sleeve 244 and mounts the slow speed dial 46 on its front end. The compound gear 243 is formed of a larger diameter mutilated gear 247 which has a toothless gap 247a formed therein in which a continuously rotating time driven pinion 248 normally has idling rotation. The time driven pinion 248 is driven through a large concentric gear 251 which receives its drive from the synchronous motor and the clock train at any desired point, well understood by those skilled in the art, such as from the pinion 102 driven by large gear 101 of the clock train gearing 101–109 shown in FIGURE 13. These two time driven gears 248 and 251 rotate on a transverse shaft 252, and the pinion 248 has a spring centered laterally deflectable mounting on this shaft 252, such being diagrammatically indicated at 255. This laterally deflectable mounting 255 is preferably constructed substantially in accordance with a similar construction disclosed in the copending application of Stolle and Dykinga, Serial No. 689,877, filed October 14, 1957, now Patent No. 3,038,040. This laterally deflectable mounting permits the continuously rotating pinion 248 to move sidewise momentarily if the spur teeth of the mutilated gear 247 and of the pinion 248 should momentarily have end-to-end tooth abutment. Formed integral on the back side of the compound gear 242 is a cam 256 provided with the conventional well known arrangement formed on its periphery with two closely spaced humps 257 and 258, defining a notch 259 therebetween, the bottom of which notch has substantially the same radius as the main peripheral portion of the cam wheel. Spaced in a clockwise direction immediately beyond the notch 259 and trailing hump 258 is a relatively deep notch 261. Responding to these humps and notches is a narrow pointed finger 264 which projects inwardly from a vibratory reed 266 which has hinged mounting in the front and rear frame plates and is spring biased in an inward direction by spring 267 (FIGURE 17) to hold the sensing finger 264 pressed resiliently against the cam ring 256. Extending rearwardly from that portion which carries the sensing finger 264, the reed is formed with a right angle leg 269 (FIGURE 3) which has an inwardly bent lip 276 at its rear end which enters an opening in the housing of the synchronous motor 91 so as to be responsive to the magnetic field in such motor. The provision of the humps and notches 257—261, and of the sensing finger or pin 264 and vibratory reed 266 is old and well known and need not be described in any greater detail. The feature of the present interval timer resides in the two speed dials 45 and 46, both settable through the one interval timer setting shaft 48. As shown in FIGURE 5 the front slow speed indicating dial 46 has approximately one-fourth of its segment cut away to expose the high speed dial 45 beneath it. The operating arrangement is such that the high speed dial 45 carries numerals from 0 to 60, representing from 0 to 60 minutes, and when the setting knob 47 is rotated to carry the high speed dial 45 beyond the "60" reading, the front low speed dial 46 takes over by interposing its numerical scale in the sight window 42 in front of the high speed dial 45. The low speed dial 46 carries numerical markings reading from "1" to approximately "3½" or "4," it being noted that the progression of numbers on the two dials from lower numbers to higher numbers occurs in the same counter clockwise direction on both dials.

While we have illustrated and described what we regard to be the preferred embodiment of our invention, nevertheless it will be understood that such is merely exemplary and that numerous modifications and rearrangements may be made therein without departing from the essence of the invention.

We claim:

1. In a range timer, the combination of a time driven member, an electric switch, a stop time dial, a first rotatable, but non-shiftable, setting knob and shift for setting up on said stop time dial a desired stop time, a cooking hours dial having a series of numerals thereon for indicating a scale of cooking hours, and also having an "Off" indication and a "Manual" indication thereon, a second rotatable, but non-shiftable, setting knob and shaft for manually setting up on said cooking hours dial a desired number of cooking hours, a planetary gear transmission mechanism comprising a sun gear, a planetary gear meshing with and rotating in an orbital path around said sun gear and an outer planetary ring gear surrounding the orbital path of said planetary gear and meshing with said planetary gear, means responsive to settings imparted to said stop time dial for transmitting adjusting motion to said sun gear and thence to said planetary gear, means responsive to settings imparted to said cooking hours dial for transmitting adjusting motion to said outer planetary ring gear and thence to said planetary gear, a first time driven tripping means responsive to the operation of said time driven member for effecting continuous time driven rotation, a second tripping means responsive to said planetary gear and adapted to effect tripping engagement with said first tripping means at a time which is automatically predetermined by the settings given to said stop time dial and to said cooking hours dial, means responsive to such cooperative engagement between said first and second tripping means for causing movement of said electrical switch to closed position, means operative during the cooking operation for driving said cooking hours dial backwardly to a switch off position, means responsive to said cooking hours dial reaching said switch off position for turning said electrical switch into off condition, means responsive to the manually actuated rotation of said cooking hours dial from said "Off" position into a position denoting the desired number of cooking hours for thereby automatically placing the range timer in its set condition, and means responsive to the manually actuated rotation of said cooking hours dial into its "Manual" position for thereby automatically moving said electrical switch into closed position.

2. In a range timer, the combination of a time driven member, an electrical switch, a stop time dial, means for manually setting up a desired stop time on said stop time dial, a cooking hours dial having a series of numerals thereon for indicating a scale of cooking hours and also having an "Off" indication thereon, a rotatable, but non-shiftable, setting knob and shaft for manually setting up on said cooking hours dial a desired number of cooking hours for the cooking operation, a planetary gear mechanism comprising three elements consisting of a sun gear, a planetary gear meshing with and rotating in an orbital path around said sun gear, and an outer planetary ring gear surrounding the orbital path of said planetary gear and meshing therewith, means responsive to the setting given to said stop time dial for transmitting a corresponding adjusting motion to one of said planetary gear mechanism elements, means responsive to the settings given to said cooking hours dial for transmitting adjusting motion to another one of the elements of said planetary gear mechanism, a first tripping means responsive to said time driven member having continuous time driven rotation therefrom, a second tripping means responsive to the position of the other of said planetary gear elements established by the settings given to said first and second planetary gear mechanism elements, means responsive to cooperative engagement between said first and second tripping means for closing said electrical switch to start the cooking operation, means operative during the cooking operation for driving the cooking hours dial rearwardly back to its off position, means responsive to the cooking hours dial reaching said off position for moving said electrical switch to off position, and means responsive to the manually actuated rotation of said cooking hours dial from said "Off" position into a position denoting the desired number of cooking hours for thereby automatically placing the range timer in its set condition.

3. In a range timer of the class described, the combination of a time driven member, an electrical switch, a rotatable stop time dial, means for manually setting up on said stop time dial a desired stop cooking time, a rotatable cooking hours dial having a series of numerals thereon for indicating a scale of cooking hours and also having a "Manual" indication thereon, a rotatable, non-shiftable setting knob and shaft for manually setting up on said cooking hours dial a desired number of cooking hours through which it is desired that the cooking operation is to continue, a planetary gear mechanism comprising a central sun gear, a planetary gear meshing with and rotating in an orbital path around said sun gear, and an outer planetary ring gear surrounding the orbital path of said planetary gear and meshing with said planetary gear, a rotatable carrier revolving around the axis of said sun gear and serving to rotatably carry said planetary gear in its orbital path, a pair of diametrically opposite interlocking lugs projecting from said rotatable carrier, a time driven wheel driven by said time driven member having a pair of diametrically opposite interlocking slots formed therein operative to receive the tripping lugs on said carrier, means responsive to relative axial shifting movement between said time driven wheel and said carrier when said tripping lugs register with said tripping slots for actuating said electrical switch into closed position for starting the cooking operation, means operative during the cooking operation for driving the cooking hours dial rearwardly from its set position back to an off position, means automatically responsive to the cooking hours dial reaching such off position for moving said electrical switch to open position, and means reponsive to the manually actuated rotation of said cooking hours dial into said "Manual" position for thereby automatically moving said electrical switch to closed position.

4. In time switch mechanism of the class described, the combination of a time driven member, an electrical switch, a stop cooking dial, a cooking hours dial having a series of numerals thereon for indicating a scale of cooking hours and also having an "Off" indication thereon, two rotatable, non-shiftable setting knobs for selectively adjusting each of said two dials to a desired set position, planetary gear mechanism comprising a sun gear, a planetary gear mounted in a gear carrier and rotating in an orbital path around said sun gear, and an outer planetary ring gear encircling said orbital path and meshing with said planetary gear, mechanism responsive to the establishment of the desired setting on one of said dials for transmitting movement through said sun gear to said planetary gear concurrently therewith, mechanism responsive to the establishment of the desired setting on the other of said dials for transmitting reverse rotary movement through said outer planetary ring gear to said planetary gear, tripping lugs moving with said planetary gear carrier, a time driven wheel driven from said time driven member and having tripping slots therein operative to effect registration with said tripping lugs, means responsive to such registration between said tripping lugs and said tripping slots for causing movement of said electrical switch to closed position for initiating the cooking operation, means responsive to rotation of one of said dials for moving said electrical switch back to open position at the conclusion of the cooking operation, and means responsive to the manually actuated rotation of said cooking hours dial from said "Off" position into a position denoting the desired number of cooking hours for thereby automatically placing the range timer in its set condition with said tripping lugs and the face of the coacting slotted time driven wheel bearing directly against each other.

5. In a time switch, the combination of a time driven member, an electrical switch, a first settable dial for determining when said electrical switch is to move to open position, manual means for adjusting the setting of said first dial, a second settable dial for determining the length of time that said electrical switch is to remain in closed position, said second settable dial having an "OFF" indication thereon, a non-shiftable, rotatable setting knob for adjusting the setting of said second dial, mechanism for automatically determining the operation of said electrical switch in response to the settings given to said two dials comprising a planetary gear mechanism consisting of a central sun gear, a planetary gear revolving in a circular orbit around said central sun gear and remaining in continuous mesh therewith, and an outer internal planetary ring gear surrounding said orbit and having mesh with said planetary gear, means responsive to the settings given to one of said dials for transmitting motion to said planetary gear through said sun gear, means responsive to the settings given to the other of said dials for transmitting motion to said planetary gear through said outer internal planetary ring gear, a planetary carrier for mounting said planetary gear, means coacting between said time driven member and said planetary carrier for controlling the operation of said electrical switch into one position, a cam wheel rotating with said outer planetary ring gear, cam surfaces on said cam wheel, lever means responsive to said cam surfaces for controlling the operation of said electrical switch into the other of its positions, and means co-acting with said cam wheel, cam surfaces and lever means and responsive to the manually actuated movement of said second settable dial from said "Off" position into a time indicating position for thereby automatically setting the time switch in its set position.

6. In a range timer, the combination of a time driven member, an electrical switch, a stop cooking dial and a cooking hours dial mounted on separate spaced axes, said cooking hours dial having a series of numerals thereon for indicating the cooking hours time and also having an "Off" indication thereon, planetary gear elements comprising a central sun gear, a planetary gear rotating in a circular orbit around said central sun gear and remaining in continuous mesh therewith, an outer planetary ring gear surrounding such circular orbit and remaining in continuous mesh with said planetary gear, means responsive to the settings given to one of said dials for adjusting the orbital position of said planetary gear through said sun gear, means responsive to the adjustments given to the other of said dials for adjusting the orbital position of said planetary gear through said outer planetary ring gear, means cooperating between said time driven member and said planetary gear for determining the time when said electrical switch is to move to one position, means responsive to reverse rotation of one of said dials for determining the time when said electrical switch is to move to another position, manually actuated setting knobs operable solely by rotary movement, without any axial shifting movement, for establishing different settings on said dials, and means responsive to the manually actuated rotation through one of said knobs of said cooking hours dial from said "Off" position into a position denoting the desired number of cooking hours for thereby automatically placing the range timer in its set condition.

7. Apparatus as defined in claim 6 in which the stop cooking dial can be turned either clockwise or counter clockwise from any position in setting up the stop cooking time on the range timer.

8. Apparatus such as is defined in claim 6 embodying a cam wheel rotating with one of the elements of said planetary gear mechanism, cam surfaces on said cam wheel, and a lever system responsive to such cam surfaces for determining one of the positions of said electrical switch.

9. In a range timer, the combination of a time driven member, an electric switch, a stop cooking dial, manual means for setting up a stop cooking time on said stop cooking dial, a cooking hours dial, manually operated cooking hours control means for manually setting up a desired number of cooking hours on said cooking hours dial, planetary gear elements comprising a central sun gear, a planetary gear revolving in an orbital path around said central sun gear and an outer planetary ring gear surrounding said orbital path and meshing with said planetary gear, means responsive to the time set up on one of said dials for adjusting the position of said planetary gear in its orbital path through said sun gear, means responsive to the setting given to the other of said dials for transmitting motion to determine the position of said planetary gear in its orbital path through said outer planetary ring gear, mechanism jointly responsive to said time driven member and to the orbital position of said planetary gear for determining when said switch is to move to closed position, means responsive to rotary motion of another of said dials for determining when said electrical switch is to move to open position, and means automatically responsive to motion of one of said dials out of an off position for automatically placing the range timer in set position without the performance of any other control operation.

10. In time switch mechanism of the class described, the combination of an electrical switch, a time driven member, a first switch controlling dial controlling the operation of said electrical switch, a second switch controlling dial controlling the operation of said electrical switch, means for manually rotating each of said two dials to desired set positions, planetary gear elements comprising as a first element a central sun gear, as a second element a planetary gear operable to revolve in a circular orbit around said central sun gear while remaining in mesh therewith, and as a third element an outer internal planetary ring gear surrounding said orbit and remaining in mesh with said planetary gear, means operatively connecting said first switch controlling dial with said first planetary gear element, means operatively connecting the second of said switch controlling dials with the third of said planetary gear elements, means cooperating between said time driven member and said second planetary gear element for controlling the movement of said electrical switch into one position, one of said dials having an "Off" position, means for automatically driving said latter dial back toward said "Off" position during the time that the electrical switch is in closed position, said latter dial having a "Manual" position, and means for moving said electrical switch to closed position when said latter dial is rotated to said "Manual" position.

11. In a range timer of the class described, the combination of an electrical switch, a time driven member, a stop cooking dial, a first setting knob and shaft rotatable about a fixed axis without axial movement for setting different times on said stop cooking dial, a cooking hours dial, a second setting knob and shaft rotatable about a fixed axis without axial movement for setting different cooking hours time on said cooking hours dial, said cooking hours dial also having a "Manual' indication thereon, planetary gear mechanism comprising a central sun gear, a planetary pinion mounted in a carrier and rotatable in a circular orbit around said central sun gear in continuous mesh therewith, and an outer planetary ring gear surrounding said orbit and having continuous mesh with said planetary gear, means responsive to the settings set up on said stop cooking dial for transmitting rotary movement through said central sun gear to said planetary gear, means responsive to the settings set up on said cooking hours dial for transmitting rotary movement through said outer planetary ring gear to said planetary gear, a pair of tripping lugs projecting from said planetary gear carrier, a slotted time driven wheel rotating synchronously with said time driven member and mounted concentrically of said planetary gear system whereby to effect registration between tripping slots in said latter time driven wheel and the tripping lugs rotating with said carrier, means responsive to registration between said tripping lugs and tripping slots for moving said electrical switch into one position, a cam wheel rotating with said outer planetary ring gear, cam surfaces provided on said cam wheel, a lever system responsive to said cam surfaces for resiliently mounting said time driven wheel so as to cause one face thereof to be pressed resiliently against the tripping lugs moving with said planetary gear, means establishing a resilient lost motion connection in said lever system for resiliently maintaining the latter face of said time driven wheel in resilient pressure engagement against said tripping lugs until said time driven wheel has rotated to the point where the tripping slots therein register with said tripping lugs, and means responsive to the manually actuated rotation of said cooking hours dial into its "Manual" indicating position for thereby automatically moving said electrical switch into closed position.

12. In a range timer, the combination of an electrical switch, a time driven member, a first rotatable setting dial for controlling an operation of said electrical switch, setting means adapted to establish different set times on said first dial, a second rotatable setting dial adapted to control an operation of said electrical switch, said second setting dial having a scale of numerals thereon and also having an "Off" indication and a "Manual" indication thereon, setting means adapted to establish any one of different set times on said second dial, a planetary gear system comprising as a first planetary element a rotatable sun gear, as a second planetary element a planetary gear rotatable through a circular orbit around said central sun gear and in continuous mesh therewith, and as a third planetary element an outer planetary ring gear encircling said orbit and maintaining continuous mesh with said planetary gear, means for transmitting rotary motion to said central sun gear concurrently with the settings set up on said first dial, means for transmitting rotary motion to said planetary ring gear concurrently with the settings set up on said second dial, means responsive to cooperative angular relationships between said time driven member and said planetary gear for controlling the movement of said electrical switch into one position, a cam wheel rotating with said outer planetary ring gear, a circular cam track formed in said cam wheel, a cam slot extending in an inward direction in said cam wheel from said circular cam track through a throat opening, a lever system comprising a cam follower pin adapted to ride on said circular cam track and to enter said cam slot, means responsive to said lever system for controlling said electrical switch, one edge of said cam slot throat joining with said circular cam track through a relatively gradual curve, a swinging adjusting segment having rotary motion with said cam wheel and movable into a position to give a substantially sharp drop-off shoulder to enable the cam follower pin to enter the side of said throat with a relatively sharp drop-off action, said swinging adjusting segment being movable into a non-effective position when the cam follower pin is moving outwardly from the slot onto the circular cam track along the latter edge of said throat whereby to afford gradual swinging movement to said cam follower pin in such outward movement, means responsive to the rotation of said second setting dial from said "Off" position into a numeral indicating position for thereby automatically placing the range timer in its set condition, and means responsive to the rotation of said second setting dial into its "Manual" indicating position for thereby automatically moving said electrical switch into closed position.

13. Apparatus such as is defined in claim 5 wherein said lever means comprises a first lever responsive to the cam surfaces on said cam wheel, a second lever actuated by said first lever, an inverted V-shaped cam slot in said second lever, a third lever having a cam follower tracking in said cam slot, and means responsive to said third lever for controlling the movement of said electrical switch into its different positions.

14. Apparatus such as is defined in claim 5 wherein said lever means comprises a first lever responsive to said cam surfaces, a second lever actuated by said first lever, a third lever actuated by said second lever for controlling the movement of said electrical switch, and a fourth lever responsive to movement of said second lever for transmitting a shifting bias to said time driven member toward said planetary carrier.

15. An interval timer comprising a time driven member, audible signaling means, a fast time dial for indicating a time interval of short duration, a slow time dial for indicating a time interval of long duration, both of said dials being concentrically mounted, a single setting shaft and knob displaced from the axes of said two dials, gear mechanism operatively connecting said single time interval setting shaft with both of said dials for transmitting different rates of rotation thereto, cam means mounted concentrically of the axes of both dials and operatively connected therewith, and means responsive to said cam means for effecting operation of said audible sounding means at the expiration of the desired time interval.

References Cited in the file of this patent

UNITED STATES PATENTS

| | | |
|---|---|---|
| 2,605,833 | Bliss | Aug. 5, 1952 |
| 2,673,258 | Gallagher et al. | Mar. 23, 1954 |
| 2,733,764 | Bliss | Feb. 7, 1956 |
| 2,783,835 | Poole | Mar. 5, 1957 |
| 2,820,859 | Davies et al. | Jan. 21, 1958 |
| 2,913,544 | Goddard | Nov. 17, 1959 |
| 2,944,444 | Burns | July 12, 1960 |

UNITED STATES PATENT OFFICE
CERTIFICATE OF CORRECTION

Patent No. 3,098,131            July 16, 1963

William P. Gallagher et al.

It is hereby certified that error appears in the above numbered patent requiring correction and that the said Letters Patent should read as corrected below.

Column 15, line 67, for "shift" read -- shaft --; column 20, line 4, for "dail" read -- dial --.

Signed and sealed this 28th day of January 1964.

(SEAL)
Attest:

ERNEST W. SWIDER
Attesting Officer

EDWIN L. REYNOLDS
Acting Commissioner of Patents